United States Patent [19]

Baumgarten

[11] Patent Number: 4,773,280
[45] Date of Patent: Sep. 27, 1988

[54] SPRING CLIP CABLE SUPPORT ASSEMBLIES

[75] Inventor: John M. Baumgarten, Saline, Mich.

[73] Assignee: Acco Babcock Inc., Fairfield, Conn.

[21] Appl. No.: 32,580

[22] Filed: Apr. 1, 1987

[51] Int. Cl.[4] .............................. F16C 1/10; F16B 9/00
[52] U.S. Cl. .................................. 403/197; 74/502.4; 285/162; 403/238; 248/56
[58] Field of Search ............... 74/501 R, 501 A, 502.4, 74/502.6; 403/197, 238, 239, 288; 285/162; 16/108; 439/585, 578

[56] References Cited

U.S. PATENT DOCUMENTS

| | | | |
|---|---|---|---|
| 3,415,549 | 12/1968 | Chatham | 74/501 R |
| 3,929,031 | 12/1975 | Webb | 74/501 R |
| 3,958,300 | 5/1976 | Tanaka | 403/197 |
| 4,131,379 | 12/1978 | Gordy et al. | 74/501 R |
| 4,304,148 | 12/1981 | Hamman | 74/501 R |
| 4,324,503 | 4/1982 | Sevrence | 74/501 R |
| 4,494,719 | 1/1985 | Guidicelli | 248/27.1 |
| 4,621,937 | 11/1986 | Maccuaig | 403/197 |

FOREIGN PATENT DOCUMENTS 2930833  2/1981  Fed. Rep. of Germany ...... 403/197

Primary Examiner—Gary L. Smith
Assistant Examiner—Vinh Luong
Attorney, Agent, or Firm—Barnes, Kisselle, Raisch, Choate, Whittemore & Hulbert

[57] ABSTRACT

A spring clip cable support assembly for use with a cable comprising an outer conduit and an inner flexible cable extending through the conduit comprising a body having an opening therethrough and having a radial flange intermediate its ends, a spring clip pressed about a portion of the body and a resilient tubular seal member within the body. The spring clip has one end engaging the flange of the body and includes a first set of axially extending spring fingers having free ends extending radially outwardly and a second set of resilient spring fingers having free ends extending radially inwardly into the recess in the body. A portion of the body is crimped on a conduit and then the body and spring assembly are inserted through an opening in a wall or bracket with the wall extending the radial flange on the body. As the assembly is inserted into the opening, the first set of spring fingers are compressed radially inwardly and then spring outwardly locking the assembly and conduit in place and the second set of fingers engage the groove in the body.

6 Claims, 2 Drawing Sheets

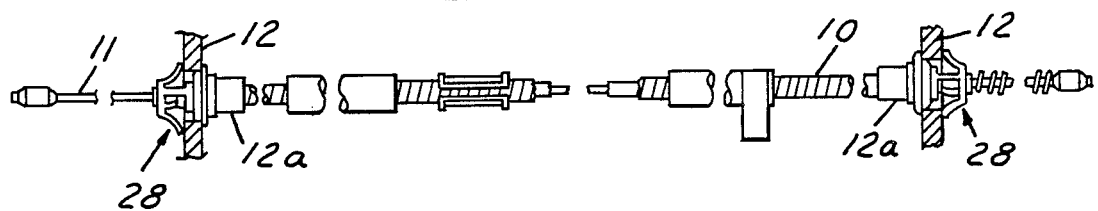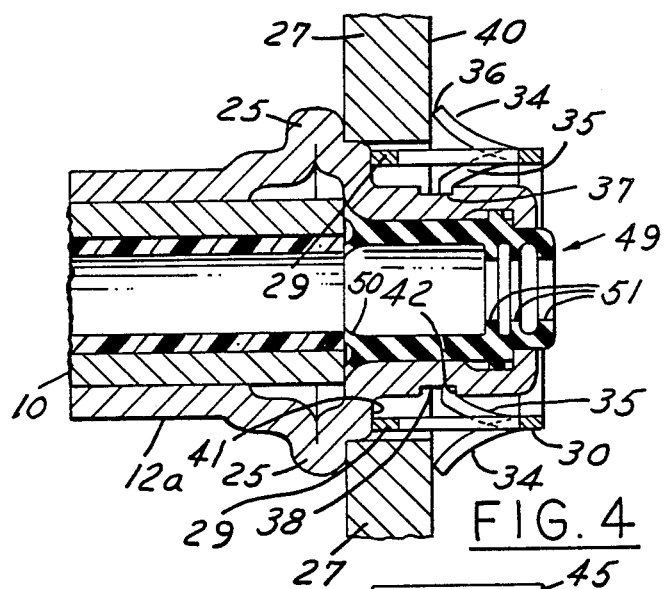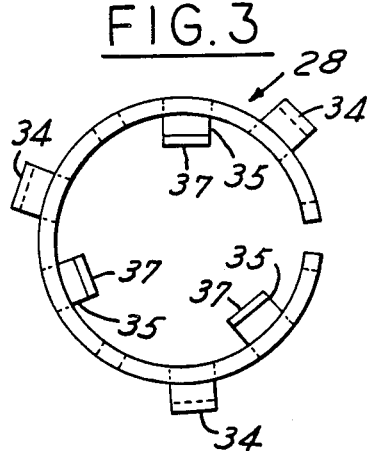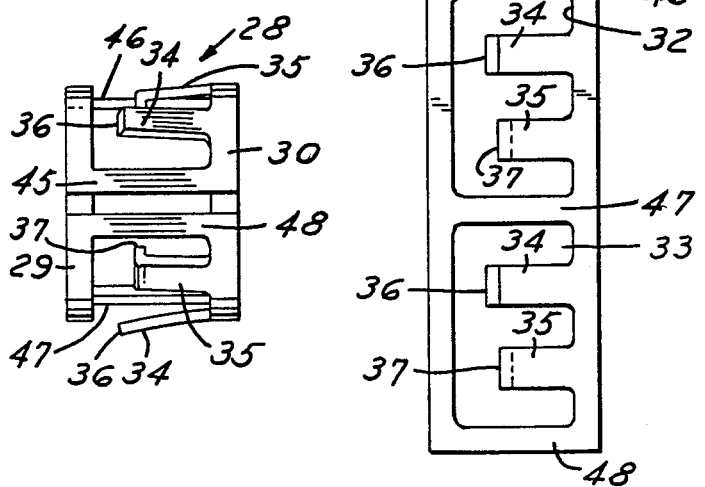

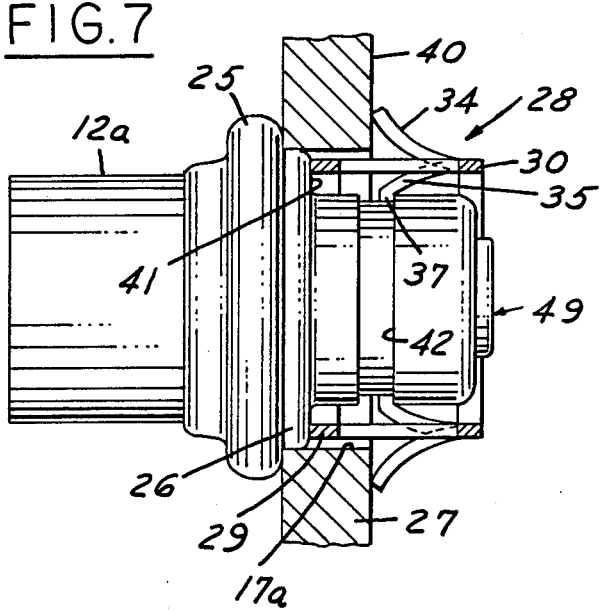
FIG. 6 PRIOR ART
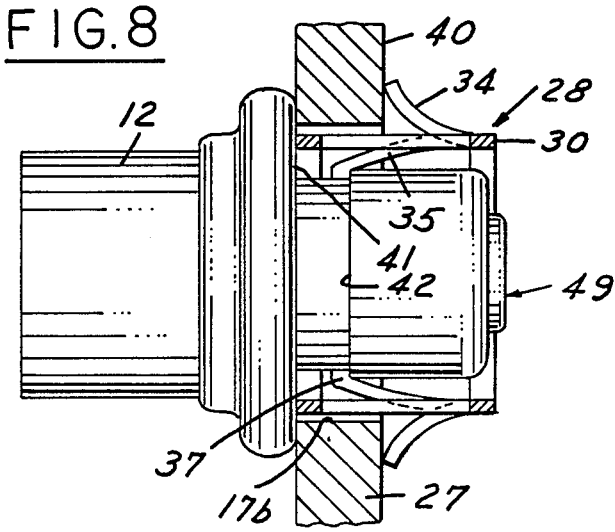
FIG. 7
FIG. 8

SPRING CLIP CABLE SUPPORT ASSEMBLIES

This invention relates to spring clip cable support assemblies.

BACKGROUND AND SUMMARY OF THE INVENTION

In cable controls of the type which include an outer conduit and an inner cable extending through the conduit, it has been common to provide spring clip assemblies for supporting the conduit along the cable control.

It is old in the prior art to provide a spring clip assembly which supports and comprises a body having an integral radial flange and a spring clip having longitudinally extending spring fingers with free ends extending radially outwardly such that when the assembly is inserted through a wall through an opening in a wall, the spring fingers spring outwardly to hold the subassembly in position. In such prior art construction, it is customary to have a short finger extend from the inner end of the spring clip and have a free end extending radially inwardly into a groove in the body to lock the spring clip against longitudinal movement axially of the body. In such a prior art arrangement, it is also customary to utilize a resilient seal within a portion of the body to engage the conduit about which the assembly is crimped.

Among the objectives of the present invention are to provide a spring clip assembly which reduces the consequent plastic deformation that occurs in prior type clips; which is shorter in length; which more effectively holds the spring clip on the body; which can be more rigid wherein the body can be made by die casting or stamping.

DESCRIPTION OF THE DRAWINGS

FIG. 1 is a fragmentary view of a portion of a cable control system embodying the invention.

FIG. 2 is a fragmentary longitudinal sectional view of a spring clip cable support assembly utilized in FIG. 1.

FIG. 3 is an end view of the spring clip utilized in the assembly shown in FIG. 2.

FIG. 4 is a plan view of the spring clip as it is first formed.

FIG. 5 is a side elevational view showing the spring clip after it has been bent into tubular form for placement over the body.

FIG. 6 is a sectional view of a prior art spring clip cable support assembly.

FIG. 7 is a sectional view of a spring clip assembly embodying the invention.

FIG. 8 is a spring clip of a modified form of spring clip assembly embodying the invention.

DESCRIPTION

This invention relates to cable controls and particularly to cable controls of the type which include an outer conduit and an inner cable extending through the conduit. More specifically the invention relates to a spring clip assembly for supporting the conduit along the cable control.

Referring to FIG. 1, a cable control to which the invention relates comprises an outer conduit 10 and an inner cable 11 that extend between two points in, for example, an automobile or the like. In such an arrangement, it is required to support the cable control at various points along the length of the conduit by supports 12.

Referring to FIG. 6, prior art supports comprise a body 12 having an integral radial flange 13 and a spring clip 14 having longitudinally extending spring fingers 15 with free ends 16 extending radially outwardly such that when the assembly is inserted through a wall through an opening 17 in a wall 18, the spring fingers 15 spring outwardly to hold the subassembly in position. In such prior art construction, it is customary to have a short finger 19 that extend from the inner end of the spring clip and has a free end 20 extending radially inwardly into a groove 21 in body 12 to lock the spring clip against longitudinal movement axially of the body. In such a prior art arrangement, it is also customary to utilize a resilient seal 22 within a portion of the body to engage the conduit 10 about which the assembly is crimped.

A typical spring clip assembly known in the art such as that shown in U.S. Pat. No. 4,324,503, incorporated herein by reference.

Referring to FIGS. 2–5 and 7, the spring clip cable support assembly embodying the invention comprises a modified body 12a which includes an integral first folded over radial flange 25 and a second shoulder 26 having a lesser radius than the flange 25 which is adapted to extend through an opening 26 in a wall 27, the shoulder and flange supporting and holding the clip in position in the opening. A spring clip 28 is made preferably by stamping from a sheet to define an end 29 and an end 30. The clip is formed with a plurality of rectangular openings 31, 32, 33 each of which is provided with an integral first spring finger 34 that extends from the edge 30 outwardly with respect to the plane of the sheet and an integral second spring finger 35 that extends inwardly at a slight angle with respect to the plane of the sheet. When the clip 28 is bent to a circular C-shaped configuration as shown in FIG. 3, the ends 29, 30 are cylindrical and the spring fingers 34 extend gradually outwardly beyond the cylindrical configuration while the spring fingers 35 extend gradually inwardly with respect to the cylindrical configuration. Integral longitudinal ribs 45, 46, 47, 48 connect ends 29, 30.

A tubular seal 49 made of resilient material has annular seal 50 at one end which engages the conduit 10 and radial sealing ribs 51 at the other end which engage the cable 11.

Fingers 34 are provided with bent ends 36 which are adapted to engage the wall 27 and fingers 35 are provided with radially inwardly extending bent ends 37 that engage an annular groove 42.

In assembly, the components are made and seal 49 is placed in body 12a. The clip 28 is then placed on body 12a with the inner ends 37 of fingers 35 engaging groove 38 on body 12a. The resultant subassembly is fastened to the conduit 10 as by crimping. The resultant assembly of spring clip cable support assembly, conduit and cable is then shipped to the manufacturer, such as an automobile manufacturer for installation in wall 27. As the spring clip assembly is placed through the opening 17a in wall 27, the fingers 34 are compressed and then snapped behind the surface 40 of the wall to hold the wall against the flange 25, in a manner similar to the prior art. However, in the present invention, the inwardly extending fingers 35 are also compressed. Thus, fingers 34 and 35 are deflected inward as well as outward, respectively in the present invention, as opposed to only inward deflection of fingers 15 in the prior art.

This results in only half of the deflection for a given finger 34, 35 of the invention when compared to the prior art. This results in less stress on the fingers and less plastic deformation or lack of resilience. For a given length of finger, this allows the ends 36 of the fingers 34 in the invention to recover to a larger diameter after insertion through the wall 27 than the fingers 16 in the prior art for a given requirement of outer finger end 36, diameter after insertion through the wall 27. The fingers 34 of the present invention can be shorter than the fingers 15 of the prior art, making a shorter clip 28 and body 12a possible. As the fingers of the invention deflect, the radially inward extending ends 37 hold the clip 28 on the body 12a.

In the form shown in FIG. 8, the spring clip is dimensioned to fit a conventional body 12 such as shown in FIG. 6. In this form, an opening 17b in the wall 27 is made larger to accommodate the larger diameter clip 28.

It can thus be seen that the spring clip assembly embodying the invention comprises which reduces the consequent plastic deformation that occurs in prior type clips; which is shorter in length; which more effectively holds the spring clip on the body; which can be more rigid wherein the body can be made by die casting or stamping.

I claim:

1. For use with a cable comprising an outer conduit and an inner flexible cable extending through the conduit, a spring clip cable support assembly comprising
    a body having an opening therethrough and having a cylindrical portion and a radial flange intermediate its ends,
    said body having an annular groove on said cylindrical portion thereof,
    a spring clip,
    said spring clip being formed from a generally rectangular sheet and being bent to a generally cylindrical C-shaped configuration surrounding and spaced radially from said cylindrical portion,
    said spring clip having one end engaging said flange and another end spaced axially from said one end,
    said spring clip having a first set of spring fingers extending axially from said other end toward said one end and having free ends extending radially outwardly,
    said spring clip having a second set of spring fingers extending axially from said other end toward said one end and having free ends extending radially inwardly into said recess in said body,
    said spring assembly being adapted to be inserted through an opening in a wall such that the wall engages the radial flange on the body and such that as the assembly is inserted into the opening the first set of spring fingers flex radially inwardly and then spring radially outwardly locking the assembly in place.

2. The spring clip cable support assembly set forth in claim 1 wherein said first set of spring fingers extend gradually outwardly and said second set of spring fingers extend gradually inwardly.

3. The spring clip cable support assembly set forth in claim 2 wherein said spring fingers of said second set are shorter than the spring fingers of said first set.

4. The spring clip cable support assembly set forth in claim 2 wherein the free ends of said spring fingers of said second set extend radially inwardly into said groove.

5. The spring clip cable support assembly set forth in claim 1 wherein said spring clip includes spaced longitudinal ribs forming said one end and said other end.

6. For use with a cable comprising an outer conduit and an inner flexible cable extending through the conduit, a spring clip cable support assembly comprising
    a body having an opening therethrough and having a cylindrical portion and a radial flange intermediate its ends,
    said body having an annular groove on said cylindrical portion thereof,
    a spring clip,
    said spring clip being formed from a generally rectangular sheet and being bent to a generally cylindrical C-shaped configuration surrounding and spaced radially from said cylindrical portion,
    said spring clip having one end engaging said flange and another end spaced axially from said one end,
    said spring clip having a set of spring fingers extending axially from said other end toward said one end and having free ends extending radially outwardly,
    said spring assembly being adapted to be inserted through an opening in a wall such that the wall engages the radial flange on the body and such that as the assembly is inserted into the opening the set of spring fingers flex radially inwardly and then spring radially outwardly locking the assembly in place.

* * * * *